United States Patent [19]

Trump

[11] Patent Number: 4,802,283
[45] Date of Patent: Feb. 7, 1989

[54] HEADING AND DISTANCE MEASURING DEVICE AND METHOD

[76] Inventor: Thomas R. Trump, P.O. Box 586, Moodus, Conn. 06469

[21] Appl. No.: 48,835

[22] Filed: May 12, 1987

[51] Int. Cl.⁴ ............................................. G01C 21/20
[52] U.S. Cl. .................... 33/431; 33/1 SD; 33/1 LE
[58] Field of Search ................... 33/431, 1 SD, 1 LE, 33/413

[56] References Cited

U.S. PATENT DOCUMENTS

| | | | |
|---|---|---|---|
| 375,590 | 12/1887 | Wilson | 33/431 |
| 1,638,914 | 8/1927 | Brush | 33/431 |
| 2,004,951 | 6/1935 | Jensen | 33/431 |
| 2,339,516 | 1/1944 | Quillen | 33/431 |
| 3,193,195 | 7/1965 | Jefferies | 33/431 |
| 3,855,706 | 12/1974 | Price | 33/431 |

FOREIGN PATENT DOCUMENTS 504651  4/1939  United Kingdom ............... 33/1 LE

*Primary Examiner*—William D. Martin, Jr.
*Attorney, Agent, or Firm*—Lawrence G. Zurawsky; Thomas F. Shanahan

[57] ABSTRACT

A navigation device comprises a flat substrate, a compass rose carried on the substrate, an elongated cord affixed at one end to the center of the compass rose and at least one linear distance scale on the substrate having its origin coincident with the center of the compass rose. In use, the navigation device is placed on a navigation chart, so that the center of the compass rose lies over a predetermined point of origin on the chart and the North compass direction of the rose is in parallel alignment with the North direction indicated on the navigation chart. A taut length of the cord is extended from the center of the compass rose to a predetermined destination point. The desired heading direction is noted where the cord crosses the perimeter of the compass rose. The linear extent of the cord form the point of origin to the destination point is marked and placed along the distance scale. The distance to be traveled is noted on the distance scale at the extremity of the marked cord length.

15 Claims, 1 Drawing Sheet

U.S. Patent  Feb. 7, 1989  4,802,283
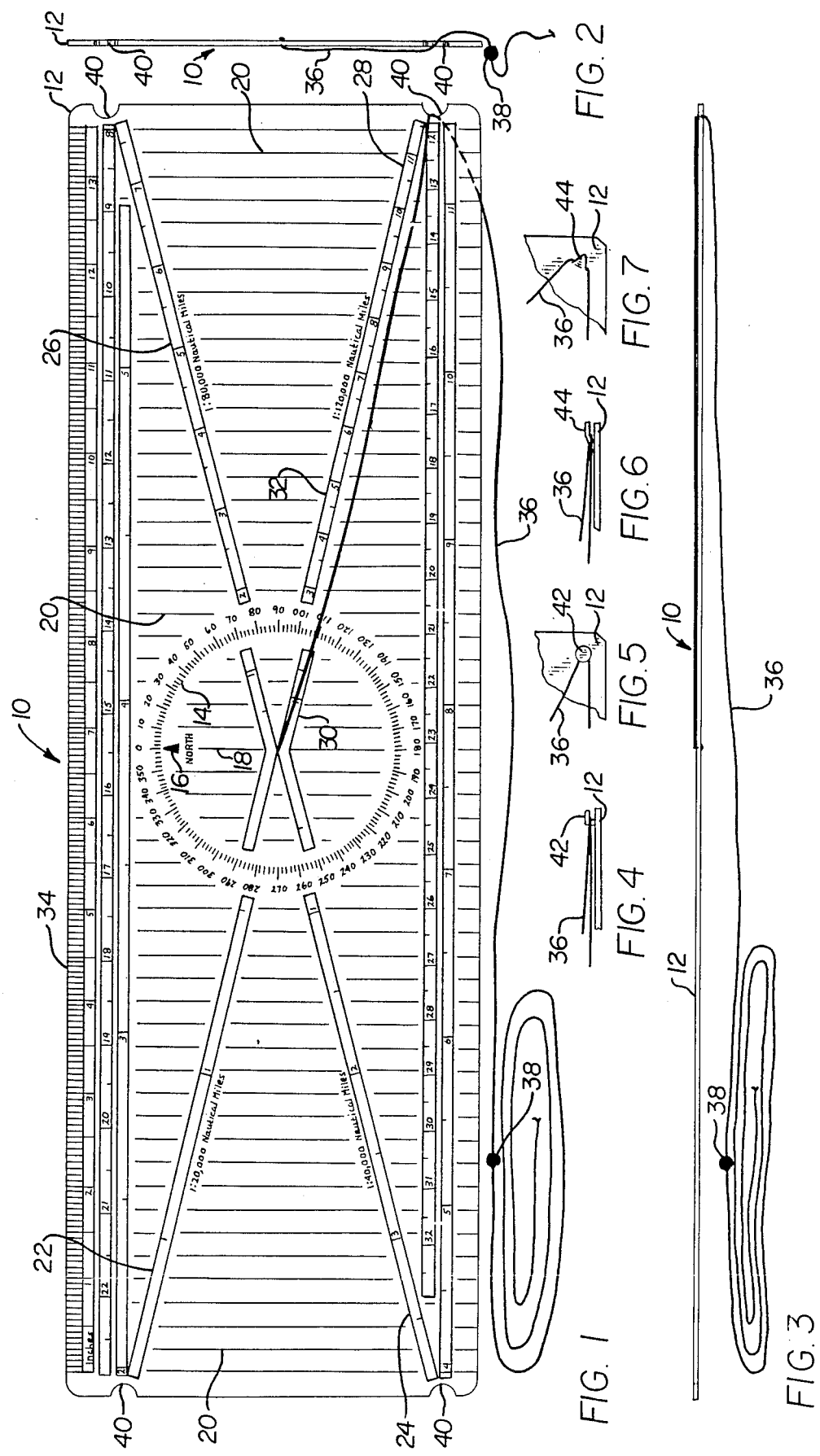

HEADING AND DISTANCE MEASURING DEVICE AND METHOD

BACKGROUND OF THE INVENTION

1. Field of the Invention

This invention relates generally to a mensuration device and method and, more specifically, to a uniquely compact and useful instrument, tool or device for broad use in navigation particularly nautical or aeronautical navigation, in order to determine quickly and accurately the heading direction and distance to be traveled between selected points located on a navigation chart. The device of the invention consists, preferably, of a transparent or semi-transparent base or body, referred to in the specification as a substrate, having preferred compact dimensions of about 5×14 inches, for placement over or upon a selected navigation chart to determine heading direction and travel distance. Imprinted, inscribed or otherwise produced on a flat, major surface of the substrate are a circular compass rose, with degree marks for each of its 360°, and a novel arrangement of "folded" distance scales which cooperate, in accordance with the practice of the invention, with a cord attached at the center of the compass rose to provide quickly and accurately the desired navigational direction and distance data or information.

2. Description of the Prior Art

In navigation and, in particular, in nautical and aeronautical navigation, it is conventional to use navigation charts in combination with one or more of a variety of hand-held navigational plotting devices, instruments or tools to plot and determine course direction and distance. The available navigation charts come in a variety of formats and, in particular, are scaled in accordance with a number of different distance scales, such as, 1 to 20,000, 1 to 40,000, 1 to 80,000, 1 to 120,000, 1 to 500,000, 1 to 1,000,000, etc. nautical or aeronautical miles. The instruments or devices available for use with such charts to determine navigational headings and/or distances and other navigational information vary dramatically in their accuracy, their reliability and the relative ease or difficulty of their use.

Specifically, it is known in accordance with U.S. Pat. No. 1,638,914 to make available for placement on a chart or map an instrument for providing general compass directions and a direct reading of distances on a tape measure. The instrument disclosed is comprised of a base carrying a circular array of compass point directions, e.g., N, NNE, NE, ENE, E, etc., about its center and having a flat tape, imprinted on one or both sides with selected distance scales. The distance scale tape is disclosed to be operatively associated with the center of the array of compass points, in a variety of ways, to permit simultaneously measuring map or chart distances directly on the tape while, at the same time, providing a general directional reading. The basic instrument disclosed, however, is not designed to facilitate accurate directional or compass orientation of the instrument with a map or chart, or to provide precise readings of heading directions, such as might be provided by conventional string protractors. Also, its distance measuring tapes and various forms of tape holders are subject to abuse and ready damage, rendering the instrument potentially unusable. In addition, the instrument is not designed to provide a straight-edge for drawing course lines, and requires an additional instrument for that purpose.

In U.S. Pat. No. 3,651,574, there is disclosed an even more complicated and cumbersome variant of the instrument disclosed in the above-mentioned patent. The disclosure of U.S. Pat. No. 3,651,574 adds to the basic concept of said earlier patent by including, as a part of the new instrument, an extendible arm for reference with a map edge to facilitate obtaining heading and distance information on a two-sided map where the point of departure is on one side of the map and the point of destination is on the other side. In other respects, the invention of U.S. Pat. No. 3,651,578 again presents most or more of the same type of deficiencies mentioned in connection with U.S. Pat. No. 1,638,914.

Additional prior art patents that are found to relate to a greater or lesser degree to the subject matter of the invention include U.S. Pat. Nos. 1,888,206; 1,984,390; 3,377,706; 3,514,582; 4,120,091; 4,149,316; 4,190,960; 4,327,497; 4,466,191; 4,499,665; Des. 135,282; Des. 135,722; Des. 148,434; Des. 196,604; Des. 209,775 and Des. 216,279. However, none of the mentioned prior art patents is found to teach, suggest or disclose either the unique structure or the novel method of navigation taught by the disclosure of the present invention. Thus, it remains for this invention to satisfy the need for a compact, sturdy, efficient and reliable navigation device for quickly and accurately determining the heading direction and distance to be traveled between selected points located on a navigation chart and to satisfy the need for such a device that can be used effectively and easily in a confined area with limited work space.

SUMMARY OF THE INVENTION

The present invention provides a navigation device and method for quickly and accurately determining the heading direction and distance to be traveled from a predetermined point of origin to a predetermined destination point, as located on a selected navigation chart. In addition, the device of this invention can be readily adapted to be used with any nautical, aeronautical or other navigation chart or even a combination thereof. Moreover, the device of the invention can also be used for rough calculation of a heading to be taken to adjust for current, tidal flow or windage by use of the device in combination with conventional or standard triangulation methods. Furthermore, the device of this invention can be used effectively and easily in a confined area of limited work space such as a kayak or other small surface craft or the cockpit of a small aircraft.

In accordance with this invention, the navigation device preferably comprises a generally rectangular and at least partially transparent plastic substrate. Typically, for example, the plastic substrate is rectangular, measuring about five inches by fourteen inches. A compass rose (circular protractor) is carried on the substrate and is located generally centrally thereon. The compass rose is calibrated from 0° to 360° clockwise and includes a due North compass direction arrow and a North longitude line marking perpendicular to one elongated side of the device and on the 0° to 180° line direction of the compass. Additional North longitude line markings are also provided at evenly spaced intervals, parallel to the 0° to 180° North longitude line marking, and on either side thereof across the body of the device.

Radiating from the center of the compass rose, in a direction generally toward each of the four corners of the elongated, rectangular device, are four separate linear distance scales. The markings on each scale are generally selected so as to represent four different ratios of chart distance to actual distance and may be expressed in nautical miles, statute miles or kilometers, for example. As each of those outwardly radiating scales approaches or reaches the proximate corner of the device, it is folded lengthwise and carried to its extremity in a position closely adjacent to and paralleling a respective one of the elongated sides of the device. Also, immediately adjacent and along at least one of said elongated sides of the device, either of which may desirably serve as a plotting straight-edge, there is preferably provided conventional ruler markings which may be in accordance with either the English or the metric system of measurement.

For reasons that will be explained further hereinafter, an elongated cord is operatively affixed at one end to the center of the compass rose. That cord has an extended length which, for convenience of use and handling is preferably somewhat longer than the maximum length of any one of the distance scales. The cord also may be provided conveniently with a frictionally affixed, movable marker, such as spherical bead. Moreover, at the respective locations proximate the corners and either at or near the narrow sides of the device, where each of the distance scales is folded lengthwise, there are provided means about which the flexible cord can be folded to follow the path of a respective one of the distance scales. In one preferred embodiment of the invention, the means may take the simple form of a notch in the narrow edge of the device, at each of the locations where a distance scale is folded. Alternatively, the cord folding means may be in the form of a convenient, upstanding pin or boss or the like on the upper surface of the device, at each of the stated locations where a distance scale is folded. The essential difference between those two structures is that, in the former case, the cord is extended in certain instances along the backside of the device to note distance to be traveled while, in the latter case, the cord remains on the top side of the device for such measurement. With all such structures, the distance scales and notch, pin or boss are constructed and arranged to assure and provide accurate distance representation and measurement in conjunction with the folded scale and measurement process. Pursuant to such construction and arrangement, the distance scale is adapted at the region of folding to accomodate the length of cord traversing the substrate portions to, around and through the notch, pins or boss and back to the beginning of the folded scale portion while maintaining accurate distance representation.

In accordance with the practice of this invention, a navigation device of the type described above is selected that carries the appropriate distance scale matching the selected navigation chart to be used for measuring heading direction and distance from a predetermined point of origin to a predetermined destination point. The device is then placed on the navigation chart so that the center of the compass rose lies over the predetermined point of origin. Contemporaneously, the device is oriented so that the due North compass direction of the compass rose is in parallel alignment with the North direction conventionally indicated on the navigation chart. In various preferred embodiments of the method of use of this invention, whether the compass rose North direction indicator is aligned with the true North direction, or with the magnetic North direction, on the chart is a matter of personal preference in the circumstances of a specific use of the invention and is not a matter critical to the subject matter of this invention.

A taut length of flexible cord is then extended from the center of the compass rose to the predetermined or preselected destination point. At this time the desired heading direction is noted on the compass rose where the taut length of cord crosses its perimeter markings. Also, the linear extent of the taut length of cord, between the point of origin and the destination point, is noted and preferably marked by the navigator's thumb nail or a suitably affixed marker. The noted and/or are marked cord length is then placed along the distance scale which was previously determined to be appropriate for the navigation chart being used and, if required, is folded around the notch, pin, boss or the like provided therefor. The distance to be traveled is then noted on, and read directly from, the distance scale at that point on the cord previously noted or marked to coincide with the desired destination point.

BRIEF DESCRIPTION OF THE DRAWINGS

FIG. 1 is a plan view of a preferred navigation device of this invention.

FIG. 2 is an elevation of the right edge of the navigation device as shown in FIG. 1.

FIG. 3 is an elevation of the bottom edge of the navigation device as shown in FIG. 1.

FIG. 4 is a fragmentary elevation of the right corner portion of the bottom edge of a navigation device of the invention, showing alternative structure to that shown in FIGS. 1, 2 and 3.

FIG. 5 is plan view corresponding to the fragmentary elevation shown in FIG. 4.

FIG. 6 is a fragmentary elevation of the right corner portion of the bottom edge of a navigation device of this invention, showing a further alternative structure to those shown in FIGS. 1 through 5.

FIG. 7 is a plan view corresponding to the fragmentary elevation shown on FIG. 6.

DESCRIPTION OF THE PREFERRED EMBODIMENT

Referring to the drawings and in particular, FIGS. 1 through 3, there is shown a preferred embodiment of the novel navigation device 10 of this invention. Navigation device 10 is comprised of a substrate 12 of a preferably transparent or, at least, semi-transparent material, such as an acrylic or polycarbonate plastic. In a preferred embodiment, substrate 12 is a flat sheet of such material. Other suitable structure may be used, such as a substrate having a flat bottom surface and a convex top surface adapted for magnification. Substrate 12, in the embodiment shown, has rectangular dimensions of about 14 inches in length by about 5 inches in width and a thickness on the order of about 1/16 inch.

Embossed, inscribed or otherwise produced in the center of a major surface of the substrate 12 is a circular compass rose 14 graduated in degrees, from 0° to 360° clockwise, and having a due North compass direction arrow or indicium 16 and a North longitude line marking 18, each directed perpendicular to an elongated side of the device on the 0° to 180° line direction of the compass rose 14. Additional North longitude line markings 20 are also provided at evenly spaced intervals, parallel to the 0° to 180° North longitude line marking 18, and on either side thereof across the body of the device 10. As will be apparent to those skilled in the art, such North longitude line markings 18, 20, including arrow indicium 16, are desirable for facilitating ease in orienting navigation devices of the type being described with like arrows and longitudinal line markings that conventionally appear on navigation charts or maps to indicate North.

Radiating from the center of the compass rose 14, in a direction generally toward each of the four corners of the elongated, rectangular navigation device 10, are four separate linear distance scales 22, 24, 26 28. The markings on each of the linear distance scales 22, 24, 26 and 28 are generally selected so as to represent four different ratios of chart distance to actual distance and may be expressed in nautical miles, statute miles or kilometers, for example. In the embodiment shown, each marked, full unit of linear distance scale 22 corresponds to the scale of specific charts (not shown) and represents 20,000 nautical miles. Similarly, each full unit of linear distance scale 24 represents 40,000 nautical miles, of scale 26 represents 80,000 nautical miles and of scale 28 represents 120,000 nautical miles. It will also be noted that those radiating portions of linear distance scales 22, 24, 26 and 28 are discontinuous along their length and, with specific reference to linear distance scale 28, for example, comprises an initial portion 30 and a distal portion 32, laterally offset from initial portion 30. This discontinuity, in each instance, occurs in the zone of the perimeter of compass rose 14 so as to avoid one physically and visually obstructing the other and, in addition, the lateral offsetting permits for maximum display, clarity and unobstructed continuity of the linear distance scales 22, 24, 26 and 28.

As each of the outwardly radiating scales 22, 24, 26 and 28 approaches or reaches the proximate corner of the device 10, it is "folded" lengthwise and carried to its extremity in a position closely adjacent to and paralleling a respective one of the elongated sides of the device. It will again be noted, by specific reference to FIG. 1, that those further portions of linear distance scales 22, 24, 26 and 28 are also so constructed and arranged on device 10 so that there is no physical or visual interference or obstruction with either compass rose 14 or between one such extended portion of a distance scale and another. Also, immediately adjacent and along at least one of the elongated sides of the device 10, either of which may desirably serve as a plotting straightedge, there is preferably provided conventional ruler markings 34 which may be in accordance with either the English or the metric system of measurement. Obviously, both of the elongated sides of the device 10 could be provided with such ruler markings 34, if desired.

For reasons that will be explained more fully hereinafter, an elongated cord 36 is operatively affixed at one end to the center of the compass rose 14. This cord 36, as shown, has an extended length which, for convenience of use and handling, is preferably somewhat longer than the maximum length of any one of the distance scales 22, 24, 26 and 28 and it may also be conveniently provided with a frictionally affixed, movable marker, such as, for example, a spherical bead 38. Moreover, at the respective locations proximate the corners and either at or near the narrow sides of the device, where each of the distance scales 22, 24, 26 and 28 is folded lengthwise, there is provided a means about which the flexible cord can be folded to follow the path of a respective one of the distance scales. In one preferred embodiment of the invention, that means may take the simple form of a notch 40 in the narrow edge of the device 10, at each of the locations where a distance scale 22, 24, 26 and 28 is folded. Alternatively, the cord folding means may be in the form of a convenient upstanding pin 42, as shown in FIGS. 4 and 5, or boss 44, as shown in FIGS. 6 and 7, or other like structure on the upper surface of the device 10, at each of the stated locations where a distance scale 22, 24, 26 and 28 is folded. The essential difference between those two structures is that, in the former case, the cord is extended in certain instances along the back side of the tool to note distance to be traveled while, in the latter case, the cord remains on the top side of the tool for such measurement.

In accordance with the practice of this invention, a navigation device 10, of the type described above is selected that carries the appropriate distance scale matching the selected navigation chart to be used for measuring heading direction and distance from a predetermined point of origin to a predetermined destination point. The device 10 is then placed on the navigation chart so that the center of the compass rose 14 lies over the predetermined point of origin. Contemporaneously, the device 10 is oriented so that the due North compass direction 16 and the North longitude line markings 18, 20, of the compass rose 14, are in parallel alignment with the North direction conventionally indicated on the navigation chart. In various preferred embodiments of the method and use of this invention, whether the compass rose North indicator is aligned with true North, or with magnetic North, on the chart is a matter of personal preference under the circumstances of use and is not a matter critical to the subject matter of this invention.

A taut length of flexile cord 36 is then extended from the center of the compass rose 14 to the predetermined or preselected destination point. At this time, the desired heading direction is noted on the compass rose 14 where the taut length of cord 36 crosses its perimeter markings. Also, the linear extent of the taut length of cord 36, between the point of origin and destination point, is noted and preferably marked, as by the navigator's thumb nail or a suitably affixed marker 33. The noted and/or marked cord length is then placed along the distance scale which was previously determined to be appropriate for the navigation chart being used and, if required, is folded around the notch 40, pin 42, boss 44 or other like structure provided therefor. The distance to be traveled is then noted on, and read directly from, the distance scale at that point on the cord previously noted or marked to coincide with the desired destination point.

According to the provisions of the patent statutes, I have explained the principle, preferred construction and mode of operation of my invention and have illustrated and described what I now consider to represent the best embodiment. However, it should be understood that, within the scope of the appended claims, the invention may be practiced otherwise than as specifically illustrated and described.

I claim:

1. A navigation device adapted for use with a selected navigation chart comprising,
 a generally elongated, rectangular, at least partially transparent substrate,
 a compass rose on said substrate,
 at least one linear distance scale on said substrate, said linear distance scale being adapted for use with said chart and havign its origin coincident with the center of said compass rose and wherein said linear distance scale radiates outwardly from the center of said compass rose in a direction generally toward an edge of said device and is discontinuous along its length and comprises an initial portion and a distal portion laterally offset from said intial portion, and an elongated flexible member adapted for placement along said linear distance scale, said elongated flexible member being operatively affixed at one end to the center of said compass rose and the origin of said linear distance scale and having its distal end free so that said flexible member can be placed in coinciding relationship along said linear distance scale.

2. A navigation device as in claim 1 in which said discontinuity occurs in the zone of the perimeter of said compass rose.

3. A navigation device adapted for use with a selected navigation chart comprising, a generally elongated, rectangular, at least partially transparent substrate, a compass rose on said substrate, at least one linear distance scale on said substrate, said linear distance scale being adapted for use with said chart and having its origin coincident with the center of said compass rose and wherein said linear distance scale radiates outwardly from the center of said compass rose in a direction generally toward a corner of said device and is folded in the proximity of said corner of said rectangular device and thence extends across said device parallel to an adjacent elongated side, and an elongated flexible member adapted for palcement along said linear distance scale, said elongated flexible member being operatively affixed at one end to the center of said compass rose and the origin of said linear distance scale and having its distal end free so that said flexible member can be placed in coniciding relationship along said linear distance scale.

4. A navigation device as in claim 3 which further includes means carried on said device for folding said elongated flexible member to follow the path of said linear distance scale.

5. A navigation device adapted for use with a selected navigation chart comprising, a generally elongated rectangular, at least partially transparent substrate, a compass rose on said substrate, at least four linear distance scales on said device, said linear distance scales being adapted for use with said chart, each having its origin conicident with the center of said compass rose, each radiating outwardly from said center in a direction generally toward a respective corner of said rectangular device and each folded in the proximity of its respective said corner and extending across said device parallel to an adjacent elongated side, and an elongated flexible member adapted for placement along said linear distance scales, said elongated flexible member being operatively affixed at one end to the center of said compass rose and the origin of said linear distance scales and having its distal end free so that said flexible member can be placed in coinciding relationship along each said linear distance scale.

6. A navigation device as in claim 5 which further includes means carried on said device in the vicinity of each said corner for folding said elongated flexible member to follow a respective one of the paths of said linear distance scales.

7. A navigation device as in claim 6 in which each said linear distance scale represents a different ratio of chart distance to actual distance.

8. A navigation device as in claim 6 in which said elongated flexible member is a cord and said means for folding said cord comprises a notch.

9. A navigation device as in claim 6 in which said elongated flexible member is a cord and said means for folding said cord comprises an upstanding pin or the like.

10. A navigation device as in claim 3 in which at least one edge of said device can serve as a straight edge and a standard ruler scale is affixed along said straight edge on said device.

11. A navigation device as in claim 5 in which said compass rose and all said distance scales are constructed and arranged so that one does not obstruct another.

12. A navigation device as in claim 3 in which said compass rose is a 360° clockwise protractor and due North on said compass rose lies on the 0° to 180° line generally perpendicular to one elongated edge of said substrate.

13. A navigation device as in claim 12 which further includes a plurality of North longitude line markings across the body of said device at evenly spaced intervals and parallel to said 0° to 180° line.

14. A navigation device as in claim 3 in which said elongated flexible member carries a frictionally affixed, movable marker along its length.

15. A method for determining the heading direction and distance to be traveled from a predetermined point of origin to a predetermined destination point, as located on a selected navigation chart, said method comprising, selecting a flat navigation device adapted for use in measuring the heading direction and distance on said selected navigation chart, placing said device so that the center of a compass rose carried thereon lies over said predetermined point of origin on said navigation chart, orienting said compass rose with its North compass direction in parallel alignment with the North direction indicated on said navigation chart, extending a taut length of cord from the center of said compass rose to said predetermined destination point, noting the desired heading direction where said taut length of cord crosses the perimeter of said compass rose, marking the length of taut cord between said point of origin and said destination point, placing said marked cord length along a distance scale on said device, said distance scale corresponding to the distance scale of said navigation chart and having its origin at the center of said compass rose, and noting the distance to be traveled on said device distance scale at the extremity of said marked cord length.

* * * * *